(12) United States Patent
Kuramoto

(10) Patent No.: US 8,363,226 B2
(45) Date of Patent: Jan. 29, 2013

(54) OPTICAL INTERFERENCE MEASURING APPARATUS

(75) Inventor: Yoshiyuki Kuramoto, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 512 days.

(21) Appl. No.: 12/716,387

(22) Filed: Mar. 3, 2010

(65) Prior Publication Data

US 2010/0225924 A1    Sep. 9, 2010

(30) Foreign Application Priority Data

Mar. 3, 2009  (JP) ................................. 2009-048880
Dec. 18, 2009  (JP) ................................. 2009-287779

(51) Int. Cl.
   *G01B 9/02*    (2006.01)
(52) U.S. Cl. ...................................................... 356/487
(58) Field of Classification Search .................. 356/484, 356/487, 453
   See application file for complete search history.

(56) References Cited

U.S. PATENT DOCUMENTS

| 6,493,091 | B2 | 12/2002 | Kourogi et al. |
| 2001/0045513 | A1 | 11/2001 | Kourogi et al. |
| 2007/0097376 | A1 | 5/2007 | Courville et al. |

FOREIGN PATENT DOCUMENTS

| EP | 1 870 028 A1 | 12/2007 |
| JP | 3739987 B2 | 1/2006 |
| JP | 2009-025245 A | 2/2009 |
| WO | 2007/016296 A2 | 2/2007 |

OTHER PUBLICATIONS

Extended European Search Report issued in corresponding European Patent Application No. 10154687.7 dated Dec. 27, 2010.
Samuel Choi et al."Frequency-Comb-Based Interference Microscope with a Line-Type Image Sensor", Japanese Journal of Applied Physics, 2007, pp. 6842-6847, vol. 46, No. 10A, Japan.
Partial European Search Report issued in corresponding European Patent Application No. 10154687.7 dated Jun. 22, 2010.
We, Chien-Ming et al., "Nonlinearity in measurements of length by optical interferometry", Measurement Science and Technology, vol. 7, No. 1, (1996) pp. 62-68, Printed in the UK. Cited in Partial Search Report issued in correpsonding EP 10154687.7 dated Jun. 22, 2010.
Kim, Seung-Woo et al., "Absolute Distance Measurement using Femtosecond Laser", Proceedings of SPIE vol. 5858, (2005) pp. 58580N-1-58580N-8, Bellingham, WA. Cited in Partial Search Report issued in Corresponding EP 10154687.7 dated Jun. 22, 2010.
Joo,Ki-Nam et al., "Absolute distance measurement by dispersive interferometry using a femtosecond pulse laser," Optics Express, vol. 14, No. 13, Jun. 26, 2006, pp. 5954-5960.

*Primary Examiner* — Tarifur Chowdhury
*Assistant Examiner* — Jonathan Hansen
(74) *Attorney, Agent, or Firm* — Rossi, Kimms & McDowell LLP

(57) ABSTRACT

An optical interference measuring apparatus comprises a first multiple-wavelength light source 200a emitting a light beam having a plurality of spectra, a second multiple-wavelength light source 200b emitting a light beam having a wavelength different from that of the light beam from the first multiple-wavelength light source, a polarizing beam splitter 6 separating the light beams, a reference surface 7 reflecting the light beam from the second multiple-wavelength light source 200b, a test surface 8 reflecting the light beam from the first multiple-wavelength light source 200a, spectral optical elements 9a, 9b dividing interference signals of the light beams, detecting devices 10a, 10b which detect interference signals having single wavelengths of the light beams for a plurality of frequencies, and an analyzer 11 processing the signals from the detecting devices 10a, 10b to calculate an optical path difference between the reference surface 7 and the test surface 8.

11 Claims, 6 Drawing Sheets

OPTICAL INTERFERENCE MEASURING APPARATUS

BACKGROUND OF THE INVENTION

1. Field of the Invention

The present invention relates to an optical interference measuring apparatus.

2. Description of the Related Art

Previously, an optical interference measuring apparatus which measures an optical path difference based on a phase difference between a test signal and a reference signal has been proposed. For example, Japanese Patent No. 3739987 discloses an optical interference measuring apparatus which measures the optical path difference between a test optical path and a reference optical path using an interference of two multiple-wavelength light sources (optical frequency comb sources) whose frequency intervals and center frequencies are different from each other. Japanese Patent Laid-open No. 2009-25245 discloses an optical interference measuring apparatus which calculates a distance based on a phase difference between a measurement signal and a reference signal for every frequency component.

Ki-Nam Joo & Seung-Woo Kim (2006) "Absolute distance measurement by dispersive interferometry using a femtosecond pulse laser "OPTICS EXPRESS, Vol. 14, No 13, pp. 5954-5960 discloses a method of dividing an interference signal of a test optical path and a reference optical path generated from one multiple-wavelength light source by a diffracting grating. In the method disclosed in the literature, an interference signal corresponding to each of the spectra of the multiple-wavelength light source is separated to perform a homodyne measurement of a phase change caused by an optical path difference with respect to frequencies. Japanese Patent Laid-open No. 2009-25245 discloses, as a method of dividing the interference signal of the test optical path and the reference optical path by one multiple-wavelength light source by a diffraction grating, a method of inserting a frequency shifter in one of the test optical path and the reference optical path to perform heterodyne detection.

However, the conventional optical interference measuring apparatus which uses two multiple-wavelength light sources whose frequency intervals and center frequencies are different from each other has two problems as follows. First, because the measurement accuracy of the optical interference measuring apparatus is sensitive to frequency stability of the two multiple-wavelength light sources, particularly to a difference of frequency intervals of the multiple-wavelength light sources, improving the accuracy of the optical interference measuring apparatus is difficult. Second, in a conventional optical interference measuring apparatus, because two frequency comb generators are necessary and also a complicated reference oscillator unit for stabilizing a difference of the frequency intervals between the multiple-wavelength light sources with high accuracy is necessary, the optical interference measuring apparatus is expensive.

Particularly, in an optical interference measuring apparatus using one multiple-wavelength light source, because a phase detection accuracy of an interference signal for homodyne detection is low, highly accurate distance measurement is difficult. Even if the frequency shifter is inserted in one of the test optical path and the reference optical path to perform the heterodyne detection, because the optical path difference between the test optical path and the reference optical path is enlarged by inserting the frequency shifter, improving the accuracy of the apparatus is difficult due to the influence of fluctuations or the like. Further, when considering a multi-axial application where a plurality of interferometers are provided to one light source, the apparatus is expensive because the frequency shifter is necessary for every interferometer.

BRIEF SUMMARY OF THE INVENTION

The present invention provides an inexpensive and highly accurate optical interference measuring apparatus An optical interference measuring apparatus as one aspect of the present invention comprises a first multiple-wavelength light source configured to emit a light beam having a plurality of spectra, a second multiple-wavelength light source configured to emit a light beam having a wavelength different from that of the light beam emitted from the first multiple-wavelength light source and having a polarization component orthogonal to that of the light beam emitted from the first multiple-wavelength light source, a polarization optical element configured to separate the light beam emitted from the first multiple-wavelength light source and the light beam emitted from the second multiple-wavelength light source, a reference surface provided at a reference position and configured to reflect the light beam emitted from the second multiple-wavelength light source, a test surface provided at a test object and configured to reflect the light beam emitted from the first multiple-wavelength light source, a spectral optical element configured to divide interference signals of the light beams of the first multiple-wavelength light source and the second multiple-wavelength light source, a plurality of detectors configured to detect interference signals having single wavelengths of the light beams emitted from the first multiple-wavelength light source and the second multiple-wavelength light source with respect to a plurality of wavelengths based on the interference signals divided by the spectral optical element, and an analyzer configured to process signals obtained from the detectors to calculate an optical path difference between the reference surface and the test surface.

An optical interference measuring apparatus as another aspect of the present invention comprises a first multiple-wavelength light source configured to emit a light beam having a plurality of spectra, a wavelength controller configured to periodically control a frequency interval between a plurality of wavelengths of the first multiple-wavelength light source, a polarization optical element configured to separate the light beam emitted from the first multiple-wavelength light source into two of a test light beam and a reference light beam, a reference surface provided at a reference position and configured to reflect the reference light beam, a test surface provided at a test object and configured to reflect the test light beam, a spectral optical element configured to divide an interference signal of the reference light beam and the test light beam, a plurality of detectors configured to detect interference signals having single wavelengths of the reference light beam and the test light beam with respect to a plurality of wavelengths based on the interference signals divided by the spectral optical element, and an analyzer configured to process signals obtained from the detectors to calculate an optical path difference between the reference surface and the test surface.

Further features and aspects of the present invention will become apparent from the following description of exemplary embodiments with reference to the attached drawings.

DETAILED DESCRIPTION OF THE PREFERRED EMBODIMENTS

Figure 1:
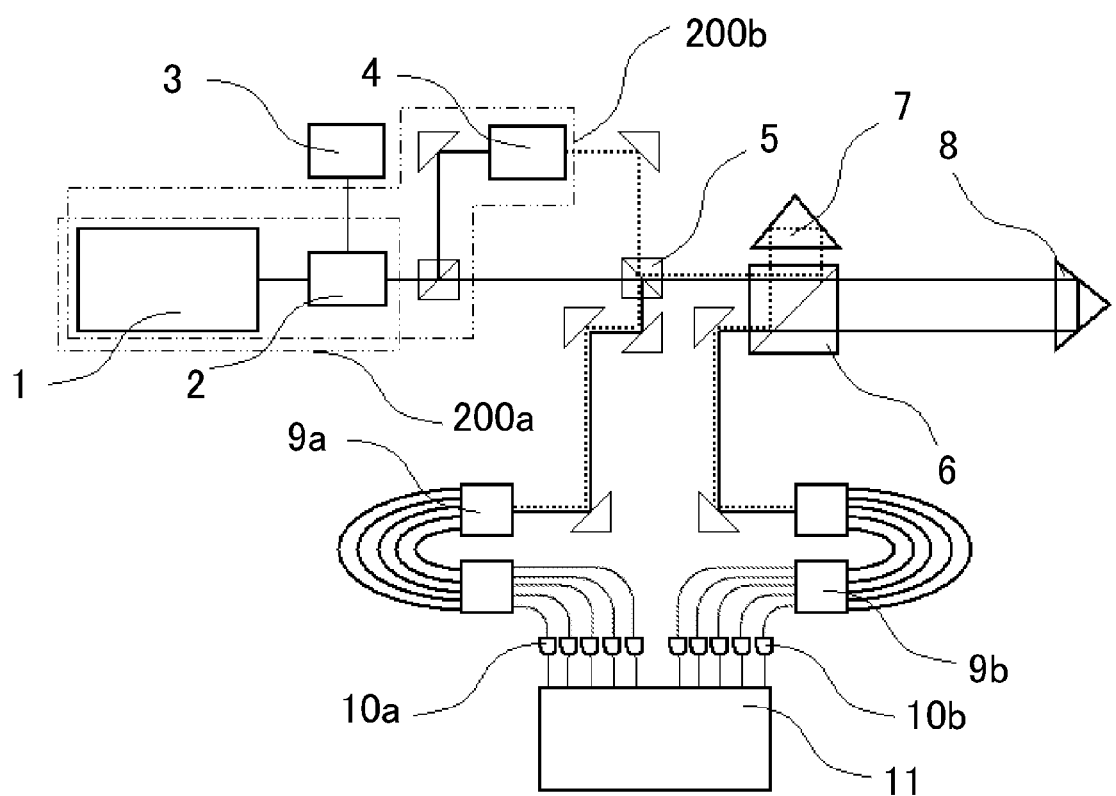
FIG. 1 is a configuration diagram of an optical interference measuring apparatus in a first embodiment.

Exemplary embodiments of the present invention will be described below with reference to the accompanied drawings. In each of the drawings, the same elements will be denoted by the same reference numerals and the duplicate descriptions thereof will be omitted.

First Embodiment

First, an optical interference measuring apparatus in a first embodiment of the present invention will be described. FIG. 1 is a configuration diagram of the optical interference measuring apparatus in the present embodiment.

In the optical interference measuring apparatus in the present embodiment, a first multiple-wavelength light source 200a is configured to include a light source 1 and a frequency comb generator 2. The first multiple-wavelength light source 200a emits a light beam having a plurality of narrowband spectra (a plurality of narrowband wavelengths). A second multiple-wavelength light source 200b is configured by adding a frequency shifter 4 to the first multiple-wavelength light source 200a, and emits a light beam having a plurality of narrowband spectra which are different from those of the light beam emitted from the first multiple-wavelength light beam 200a. The light beam emitted from the second multiple-wavelength light source 200b has a polarization component which is orthogonal to that of the light beam emitted from the first multiple-wavelength light source 200a. Each of the first multiple-wavelength light source 200a and the second multiple-wavelength light source 200b is a optical frequency comb source is a optical frequency comb source which includes a plurality of frequency components having frequency differences equivalent to each other. Each of the first multiple-wavelength light beam 200a and the second multiple-wavelength light beam 200b modulates a light beam emitted from the light source having a single narrowband spectrum by using an optical modulator to generate a light beam having a plurality of narrowband spectra.

A polarizing beam splitter 6 is a polarization optical element which divides (separates) the light beams emitted from the first multiple-wavelength light beam 200a and the second multiple-wavelength light beam 200b. A reference surface 7 is arranged at a predetermined reference position and is configured so as to reflect the light beam emitted from the second multiple-wavelength light source 200b. A test surface 8 is arranged at a test object and is configured so as to reflect the light beam emitted from the first multiple-wavelength light source 200a.

Spectral optical elements 9a and 9b are spectral optical elements which separate interference signal of the light beams emitted from the first multiple-wavelength light source 200a and the second multiple-wavelength light source 200b. Detecting devices 10a and 10b include a plurality of detectors, and detect interference signals having single wavelengths between the light beams emitted from the first multiple-wavelength light source 200a and the second multiple-wavelength light source 200b with respect to a plurality of wavelengths based on the interference signal separated by the spectral optical elements 9a and 9b, respectively. An analyzer 11 processes signals from the detecting devices 10a and 10b (the plurality of detectors) to calculate an optical path difference between the reference surface 7 and the test surface 8.

Hereinafter, a measuring principle of the optical interference measuring apparatus in the present embodiment will be described in detail. A light beam that has a single narrowband line width and that is emitted from the light source 1 after its center frequency has been stabilized with high accuracy enters the frequency comb generator 2. The frequency comb generator 2 is configured by arranging the optical modulator in a resonator, and performs a phase modulation with respect to an incident light based on a modulation signal of frequency fm from an oscillator 3. The light beam emitted from the frequency comb generator 2 becomes pectinate spectra having an interval fm spread around a center frequency that is a frequency of the light source 1, and becomes a multiple-wavelength light source in which a frequency interval of the spectra is controlled by the oscillator 3 with high accuracy. A part of the light beam emitted from the frequency comb generator 2 transmits through a half mirror and is used as the first multiple-wavelength light source 200a. In the embodiment, as a generator of the multiple-wavelength light source, an electro-optical modulator or acousto-optical modulator instead of the frequency comb generator 2 may also be used to generate a sideband. In this case, if the accuracy deterioration caused by the reduction of the number of detection signals is permissible, the apparatus is competitive in cost.

The light beam reflected by the half mirror enters the frequency shifter 4. The frequency shifter 4 shifts all the spectra generated by the frequency comb generator 2 using the acousto-optical modulator by uniform frequency df and rotates the polarized light so as to be orthogonal to the light beam emitted from the multiple-wavelength light source 200a to emit the light. Because the frequency shifter 4 does not give any change for a relative relationship of spectra, the light beam emitted from the frequency shifter 4, similarly to the first multiple-wavelength light source 200a, also becomes a multiple-wavelength light source in which a frequency interval of spectra is controlled by the oscillator 3 with high accuracy. The light beam emitted from the frequency shifter 4 is used as the second multiple-wavelength light source 200b.

Each of the light beams emitted from the first multiple-wavelength light source 200a and the second multiple-wavelength light source 200b is divided into two light beams by using a non-polarizing beam splitter 5. Hereinafter, an optical path which is divided by the non-polarizing beam splitter 5 to enter the separator 9a is referred to as a reference optical path, and an optical path which is divided by the non-polarizing beam splitter 5 to enter the polarizing beam splitter 6 is referred to as a measurement optical path.

In the measurement optical path, the light beam of the first multiple-wavelength light source 200a transmits through a reflecting surface of the polarizing beam splitter 6. On the other hand, the light beam of the second multiple-wavelength light beam 200b having a polarization component which is orthogonal to the first multiple-wavelength light source 200a is reflected by the reflecting surface of the polarizing beam splitter 6. The light beam of the second multiple-wavelength light beam 200b reflected by the polarizing beam splitter 6 is reflected by the reference surface 7 constituted by a corner cube including a plurality of reflecting surfaces. The light beam reflected by the reference surface 7 is reflected by the polarizing beam splitter 6 again to enter the spectral optical element 9b. The reference surface 7 is fixed on a reference position that is a reference of a distance measurement.

On the other hand, the light beam of the first multiple-wavelength light source 200a transmitted through the polarizing beam splitter 6 is reflected by the test surface 8 which is fixed on the test object. The test surface 8 is constituted by a corner cube similarly to the reference surface 7. The light beam reflected by the test surface 8 transmits through the polarizing beam splitter 6 again to enter the spectral optical element 9b. Thus, in both the reference optical path and the measurement optical path, the light beams of the first multiple-wavelength light source 200a and the second multiple-wavelength light source 200b are divided by the spectral optical elements 9a and 9b.

As spectral optical elements 9a and 9b, for example array waveguide gratings are used. Hereinafter, the array waveguide grating is referred to as an AWG. The AWG is an element which divides a wave by a diffraction of the wave emitted from the waveguide on the arrays whose optical paths are different from each other, and has a small size and can be obtained at a low cost. The spectral optical elements 9a and 9b are required to have wavelength resolution equal to or greater than a wavelength interval of the first multiple-wavelength light source 200a and the second multiple-wavelength light source 200b. The spectral optical elements 9a and 9b are not limited to the AWG, and for example a bulk type diffraction grating may also be used. In a case where the resolution of the diffraction grating is not enough with respect to the frequency interval of the frequency comb, an additional dispersive element such as an etalon can be inserted in front of the diffraction grating to improve the effective resolution. In some conditions of used wavelengths or bands, the bulk type spectral optical element may be configured at low cost as compared with the AWG. Further, as a spectral optical element of the present embodiment, a bandpass interference filter may also be used. When the interference filter is used, there is an advantage that the spectral optical element is easily configured in a case where the number of spectra of the multiple-wavelength light source is small and the number of the wavelengths to be measured is small.

Outputs separated by each spectrum of the multiple-wavelength light source from the spectral optical elements 9a and 9b are received by detecting devices 10a and 10b which are configured to include a plurality of detectors corresponding to respective separated outputs. The lights received by the detecting devices 10a and 10b are transmitted to the analyzer 11 as interference signals of the first multiple-wavelength light source 200a and the second multiple-wavelength light source 200b. In the embodiment, in order to obtain the interference signals of the first multiple-wavelength light source 200a and the second multiple-wavelength light source 200b, a polarizer (not shown) as an extracting unit of a polarization component common to both light sources is arranged in front of the spectral optical elements 9a and 9b.

In the present embodiment, although only a polarization component in a predetermined direction is detected, an interference signal with respect to a component orthogonal to the detected polarization component may also be detected by the spectral optical elements 9a and 9b and the detecting devices 10a and 10b, similarly. In this case, a wavelength plate is inserted in front of the polarizer so that phases of the signals detected by both the detecting devices 10a and 10b are reversed from each other to be able to perform differential detection. Therefore, more highly accurate measurement can be performed.

Figure 2:
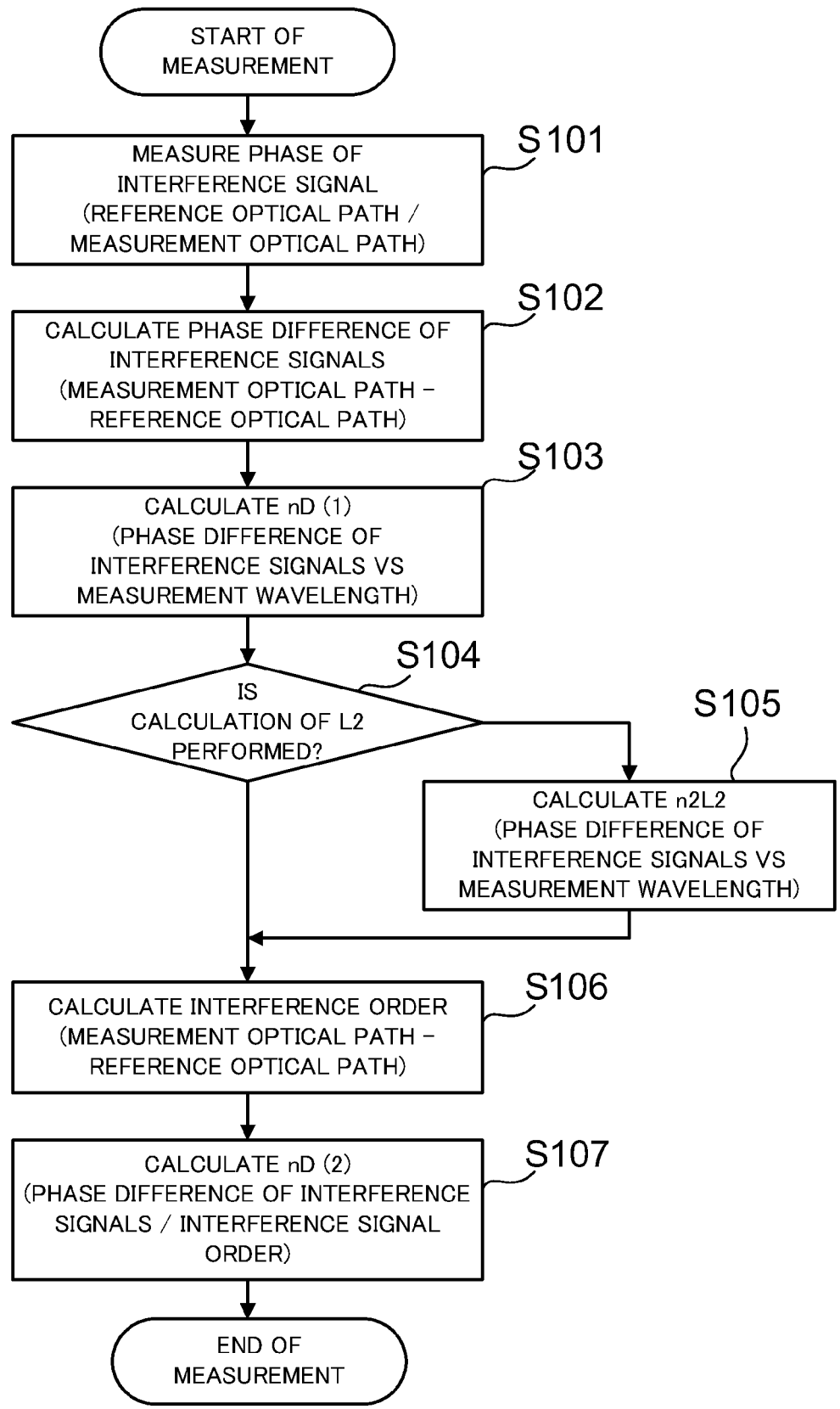
FIG. 2 is a flowchart of a measuring method performed by an analyzer in the first embodiment.

Next, an analysis which is performed by the analyzer 11 of the present embodiment will be described. FIG. 2 is a flowchart of a measuring method which is performed by the analyzer 11 in the present embodiment.

First, in Step S101, the analyzer 11 measures a phase of an interference signal (interference phase) which is obtained by every spectrum (by every frequency) with respect to each of the reference optical path and the measurement optical path. In other words, the analyzer 11 measures the interference phase between the reference surface 7 and the test surface 8 based on each interference signal with respect to a plurality of frequencies. The interference phase can be measured by providing a phase meter. In order to detect p-th wavelength separated by the spectral optical elements 9a and 9b, the interference signal measured by the p-th detector in the detecting devices 10a and 10b is represented as expressions 1 and 2, where $I^{ref}_p$ is an interference signal of a reference optical path, and $I^{test}_p$ is an interference signal of a measurement optical path.

$$I^{ref}_p = a1_p a2_p \cos\left(2\pi \cdot df \cdot t - 2\pi(f + p \cdot f_m)\frac{n_1 L_1}{c}\right) \quad (1)$$

$$I^{test}_p = a1_p a2_p \cos\left(2\pi \cdot df \cdot \left(t - \frac{n_2 L_2}{c}\right) - 2\pi(f + p \cdot f_m)\frac{n_1 L_1 + nD}{c}\right) \quad (2)$$

In the embodiment, $a1_p$ and $a2_p$ are amplitudes of p-th frequency components of the first multiple-wavelength light source 200a and the second multiple-wavelength light source 200b, respectively. $n_1 L_1$ represents an optical path difference of the optical paths of the first multiple-wavelength light source 200a and the second multiple-wavelength light source 200b in front of the non-polarizing beam splitter 5. $n_2 L_2$ denotes an optical path difference of the optical paths of the second multiple-wavelength light source between the reference optical path and the measurement optical path. nD denotes an optical path difference of the light beams of the first multiple-wavelength light source 200a and the second multiple-wavelength light source 200b behind the polarizing beam splitter 6. The phases which are obtained by detecting signals of frequency df using a phase meter are represented by the following expressions 3 and 4, where $\phi^{ref}_p$ and $\phi^{test}_p$ are phases of signals of the reference optical path and the measurement optical path, respectively.

$$\varphi^{ref}_p = -2\pi(f + p \cdot f_m)\frac{n_1 L_1}{c} \quad (3)$$

$$\varphi^{test}_p = -2\pi \cdot df \frac{n_2 L_2}{c} - 2\pi(f + p \cdot f_m)\frac{n_1 L_1 + nD}{c} \quad (4)$$

Next, in Step S102, the analyzer 11 calculates a phase difference between the signals of the measurement optical path and the reference optical path. The phase difference is obtained as the following expression 5 by calculating the difference between the above expressions 3 and 4.

$$\varphi_p^{ref} - \varphi_p^{test} = 2\pi \cdot df \cdot \left(\frac{n_2 L_2}{c}\right) + 2\pi (f + p \cdot f_m)\frac{nD}{c} \quad (5)$$

Next, in Step S103, the analyzer 11 performs a first calculation of the optical path difference nD between the reference surface 7 and the test surface 8. On the assumption that the dispersion of a refractive index can be ignored, the optical path difference nD is represented by the following expression 6 using a change rate of the phase difference (interference phase) between the reference optical path and the measurement optical path with respect to a plurality of frequencies.

$$nD^{meas1} = \frac{c}{2\pi} \cdot \frac{\partial(\varphi_p^{ref} - \varphi_p^{test})}{\partial f} \quad (6)$$
$$= \frac{c}{2\pi \cdot f_m} \cdot \frac{\partial(\varphi_p^{ref} - \varphi_p^{test})}{\partial p}$$

Figure 3:
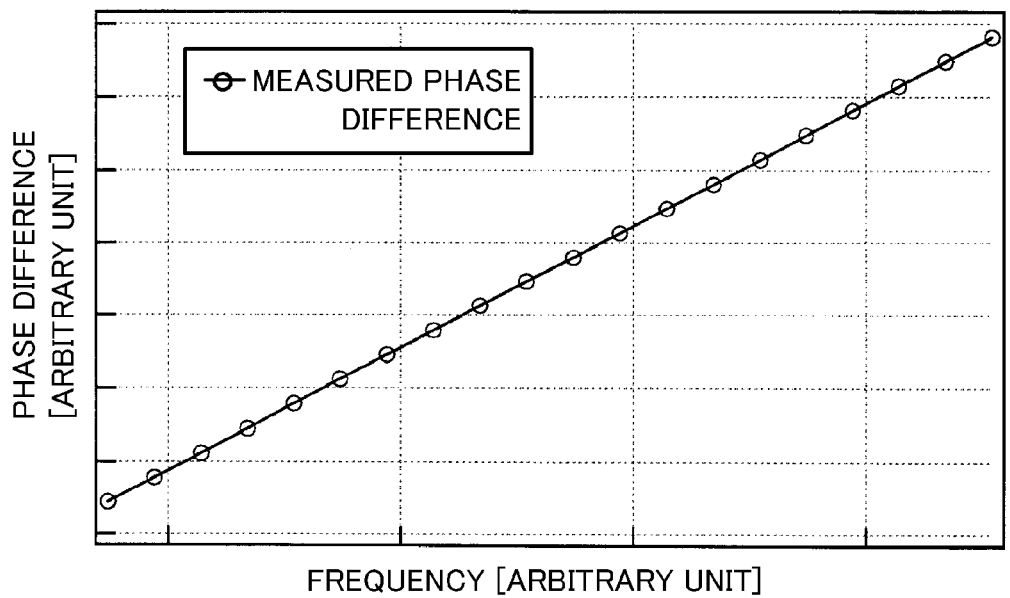
FIG. 3 is a diagram of a relationship between a phase difference of interference signals and a frequency in the first embodiment.

FIG. 3 is a diagram of a relationship between a phase difference of interference signals and a frequency in the present embodiment (measured value). A tilt (change rate) in a case where the phase differences between a plurality of reference optical paths and measurement optical paths are linearly approximated with respect to the frequency is calculated to be able to calculate the optical path difference nD. However, the measurement accuracy of the optical path difference nD obtained by expression 6 represented above is around a few hundred nm (nanometer) even if frequency fm is around 10 GHz when considering the measurement accuracy around $10^{-5}$ rad of the phase meter. The accuracy is insufficient when using it as a final output. Therefore, hereinafter, an analyzer for calculating the optical path difference nD with higher accuracy will be described.

First, in Step S105, the analyzer 11 calculates the optical path difference $n_2L_2$ between the reference optical path and the measurement optical path. Since the optical path difference $n_2L_2$ is not a value that usually changes, it is not necessary to perform the calculation every time. Therefore, as shown in FIG. 2, whether or not the calculation of the optical path difference $n_2L_2$ is performed is determined in Step S104. Based on expression 5 described above, the following expression 7 is obtained, where $n_2L_2$ is represented using optical path difference $nD^{meas1}$ in expression 6.

$$n_2 L_2^{meas} = \frac{c}{2\pi \cdot df} \overline{\left\{(\varphi_p^{ref} - \varphi_p^{test}) - 2\pi(f + p \cdot f_m)\frac{nD^{meas1}}{c}\right\}} \quad (7)$$

The over line in expression 7 means an average value with respect to "p". As described above, because the calculation frequency of the optical path difference $n_2L_2$ is low, it is preferable that the averaging is performed taking sufficient time so that the optical path difference $n_2L_2^{meas1}$ can be calculated with high accuracy. Further, with regard to the optical path difference $nD^{meas1}$ in expression 7, the accuracy can be improved by repeatedly performing the calculations using the optical path difference nD obtained by expression 9 described below.

Next, in Step S106, the analyzer 11 calculates an interference order of the interference signal based on the calculated optical path difference. The interference order means an integer multiplied by $2\pi$ in a component of an integral multiple of $2\pi$ of the phase detected based on the interference signal.

When focusing on the phase difference between the measurement optical path and the reference optical path in the p-th spectrum, the interference order $N_p$ of the p-th interference signal is represented by the following expression 8.

$$N_p = \text{round}\left(df \cdot \left(\frac{n_2 L_2^{meas}}{c}\right) + (f + p \cdot f_m) \cdot \frac{nD^{meas1}}{c} - (\varphi_p^{ref} - \varphi_p^{test})\right) \quad (8)$$

In the expression, "round ( )" represents a function which rounds an argument.

Finally, in Step S107, the analyzer 11 calculates the optical path difference nD between the reference surface 7 and the test surface 8 again. The optical path difference nD is calculated using the interference order described above and the phase difference (the interference phase) between the measurement optical path and the reference optical path for each spectrum (each of a plurality of frequencies). Therefore, the optical path difference nD is represented as the following expression 9 by averaging it with respect to all the spectra in order to improve the accuracy.

$$nD = \overline{\left\{\left(N_p + \frac{\varphi_p^{ref} - \varphi_p^{test}}{2\pi}\right) \cdot \frac{c}{(f + p \cdot f_m)}\right\}} - n_2 L_2 \quad (9)$$

Although expression 9 is a calculating formula with respect to the optical path difference nD, a geometric distance D may also be calculated by dividing the optical path difference nD by the refractive index n if needed. The refractive index n is obtained by measuring an environmental condition such as atmospheric pressure, temperature, or humidity near the optical interference measuring apparatus to perform a calculation based on a dispersion formula of the refractive index depending on the measured frequency. According to expression 9, as compared with expression 6, the highly accurate geometric distance D can be calculated as a ratio of f to fm in the same measurement accuracy of the phase difference.

In the present embodiment, the case where one optical wave interferometer is used for the light source 1 has been described, but a plurality of optical wave interferometers may also be configured for one light source 1 when a plurality of axes are measured at the same time. In this case, the light beam is divided by the necessary number behind the non-polarizing beam splitter 5, and an interferometer constituted by including the polarizing beam splitter 6, the reference surface 7, and the test surface 8 is provided for each measurement axis and also the spectral optical elements 9a and 9b and the detecting devices 10a and 10b are added for each interferometer.

As described above, according to the present embodiment, an optical interference measuring apparatus capable of performing highly accurate ranging at a low cost can be provided.

Second Embodiment

Figure 4:
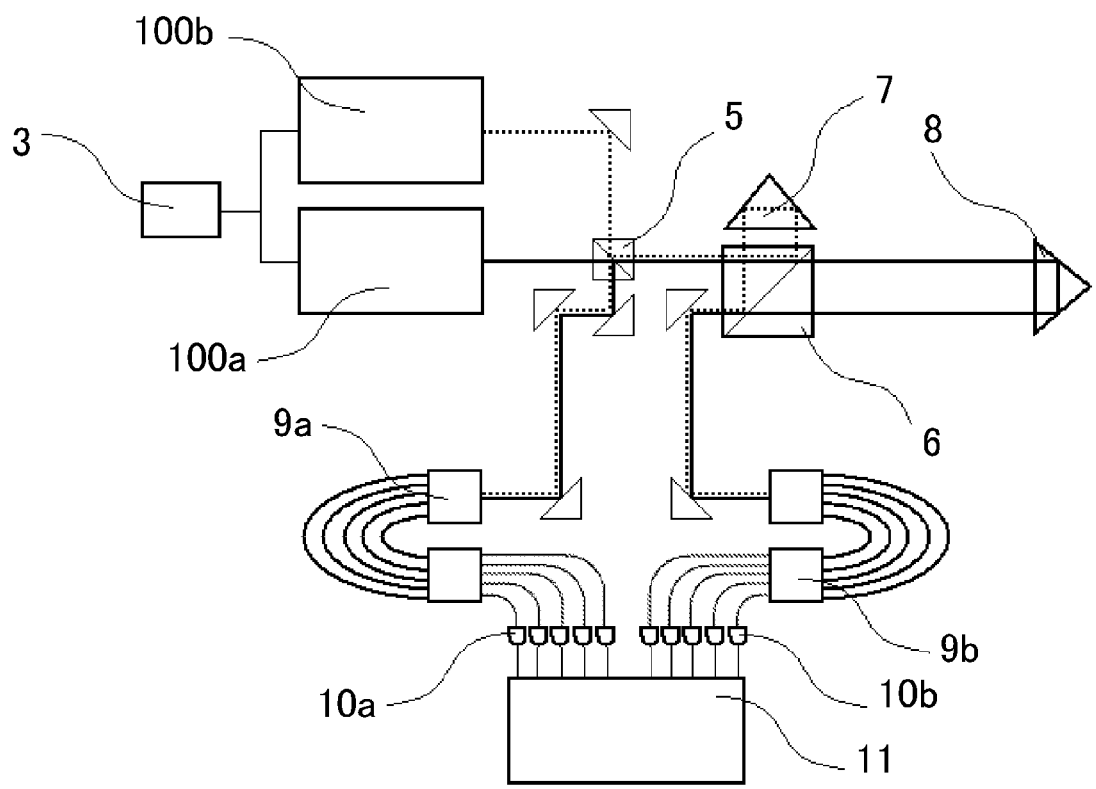
FIG. 4 is a configuration diagram of an optical interference measuring apparatus in a second embodiment.

Next, an optical interference measuring apparatus in a second embodiment of the present invention will be described. FIG. 4 is a configuration diagram of the optical interference measuring apparatus in the present embodiment.

The optical interference measuring apparatus of the present embodiment is, as shown in FIG. 4, the configuration of the light source section is different from that of the first embodiment. In the present embodiment, a wideband multiple-wavelength light source 100a which has a plurality of narrowband spectra across a wide range is used as a first multiple-wavelength light source. A femtosecond laser in which a carrier-envelope offset frequency and a frequency interval are stabilized with high accuracy is used as a wideband multiple-wavelength light source 100a. In a wideband light source, there is no frequency shifter which indicates preferable conversion efficiency across a wide range. Therefore, another independent femtosecond laser is used as a wideband multiple-wavelength light source 100b that is a second multiple-wavelength light source.

A carrier-envelope offset frequency of the wideband multiple-wavelength light source 100b is controlled so as to stably maintain a constant frequency difference df for the wideband multiple-wavelength light source 100a. The oscillator 3 is a reference oscillator that controls both the frequency intervals of the wideband multiple-wavelength light sources 100a and 100b. Thus, the frequency intervals of the wideband multiple-wavelength light sources 100a and 100b are controlled by the same oscillator 3. Therefore, according to the present embodiment, a component caused by the oscillator of a frequency interval error between the light sources, which is one of main factors of a distance measurement error, can be compensated. In the present embodiment, the configuration behind the light source is the same as that of the first embodiment and therefore it will be omitted. Similarly, with regard to the analyzing process performed by the analyzer 11, the optical path difference between the reference surface 7 and the test surface 8 is calculated based on the flowchart shown in FIG. 2.

In the present embodiment, the analyzing process which calculates a geometric distance for the optical path difference between the reference surface 7 and the test surface 8 along with the correction of the refractive index variation of the measurement optical path is performed using wideband characteristics of the wideband multiple-wavelength light sources 100a and 100b. An optical path difference $nD(f_p)$ for frequency $f_p$ is represented by the following expression 10, where D is a geometric distance of an optical path of a light beam reflected by the reference surface 7 and an optical path of a light beam reflected by the test surface 8.

$$nD(f_p) = [1 + N_{tp} \cdot B(f_p)] \cdot D \quad (10)$$

In expression 10, $N_{tp}$ is a component depending on a density of a medium in different optical paths between the reference surface 7 and the test surface 8, and $B(f_p)$ is a function depending on only a wavelength. As represented by expression 10, known dispersion characteristics of the medium between the reference surface 7 and the test surface 8 are approximated by a sum of a multiplication of a component depending on the density of the medium and a component depending on a frequency component and a refractive index of the medium in a vacuum.

When the medium in the different optical paths between the reference surface 7 and the test surface 8 is the air having a humidity of zero, the function B(f) is represented by the following expression 11 using Edlen's formula.

$$B(f) = 10^{-8} \left[ \frac{8342.54 + \frac{2406147}{130 - \left(10^{-6} \cdot \frac{f}{c}\right)^2} + \frac{15998}{38.9 - \left(10^{-6} \cdot \frac{f}{c}\right)^2}} \right] \quad (11)$$

If the medium between the reference surface 7 and the test surface 8 is different from the condition described above, an appropriate function may be provided.

The analyzer 11 of the present embodiment calculates the geometric distance D by fitting a predetermined function with respect to a measurement result of the optical path difference in order to correct the change of the density of the medium in the measurement result of the optical path difference with respect to a lot of frequencies. The predetermined function is represented by a sum of the geometric distance D and an amount of change of the optical path difference which changes depending on the refractive index of the medium between the reference surface 7 and the test surface 8. The amount of change of the optical path difference is obtained by multiplying the geometric distance D to the refractive index of the medium having the known dispersion characteristics between the reference surface 7 and the test surface 8. A fitting residual sum of squares is represented as expression 12, where $nD_{meas}(f_p)$ is a measurement result of an optical path difference and $D + N_{tp} \cdot D \cdot B(f_p)$ is a predetermined function.

$$J = \sum_p \{nD_{meas}(f_p) - (D + N_{tp} \cdot D \cdot B(f_p))\}^2 \quad (12)$$

The geometric distance D and $N_{tp} \cdot D$ for minimizing expression 12 are determined by solving a normal equation.

Figure 5:
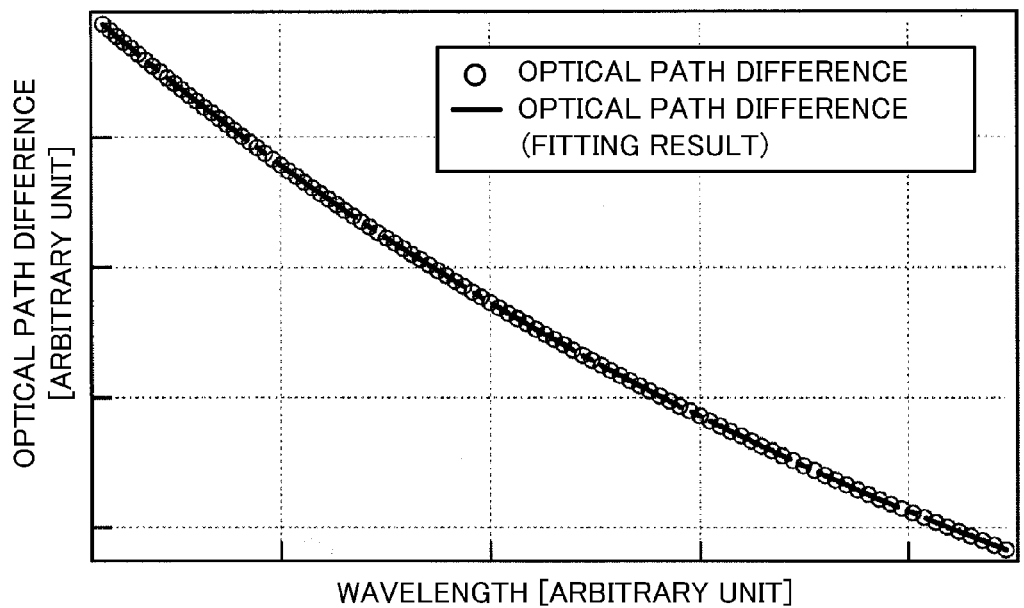
FIG. 5 is a diagram of a relationship between an optical path and a measured wavelength in the second embodiment.

FIG. 5 is a diagram of a relationship between the optical path and the measurement wavelength in the present embodiment, and shows a result where a fitting has been performed with respect to the measured optical path. Referring to FIG. 5, an optimal approximation of expression 12 represented by a dashed-dotted line is performed with respect to the measurement result of the discrete optical path indicated by "o" to be able to obtain the geometric distance D and $N_{tp} \cdot D$. If the refractive index of the medium between the reference surface 7 and the test surface 8 is required, the measurement result of the optical path of every frequency is divided by the geometric distance D between the reference surface 7 and the test surface 8 to be able to calculate the refractive index.

Thus, according to the present embodiment, even if a multiple-wavelength light source for which an independent frequency interval control is required is used, a highly accurate synchronization at a low cost can be performed by controlling the multiple-wavelength optical source based on the same oscillator. Therefore, without using a complicated reference oscillating unit, an optical interference measuring apparatus capable of correcting the influence of the refractive index variation to perform highly accurate ranging can be provided. Accordingly, a highly accurate optical interference measuring apparatus can be provided at a low cost.

Third Embodiment

Figure 6:
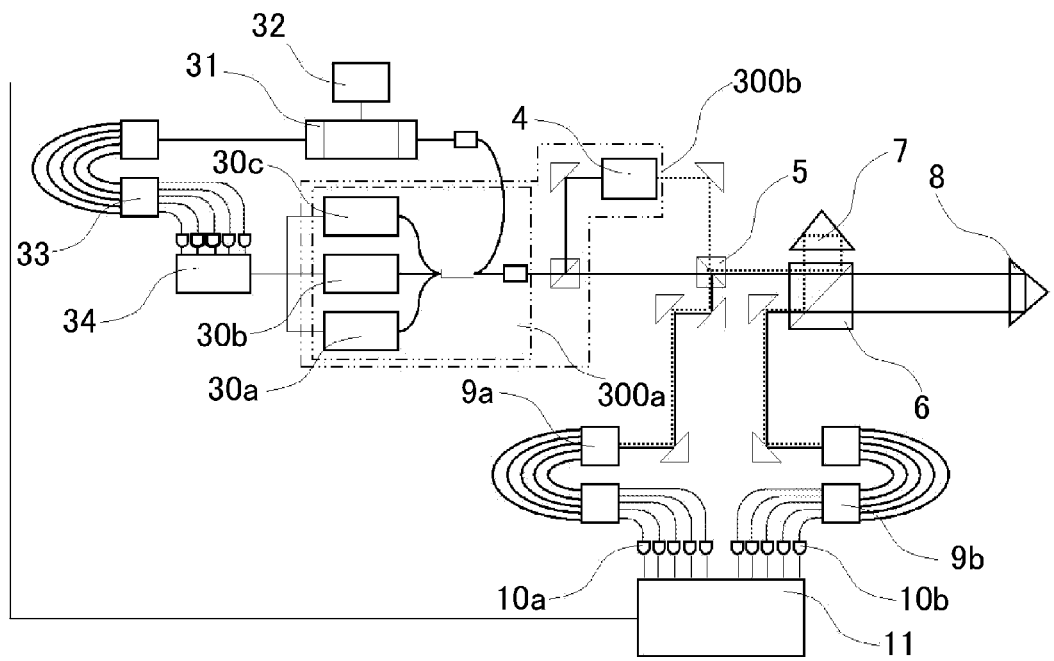
FIG. 6 is a configuration diagram of an optical interference measuring apparatus in a third embodiment.

Next, an optical interference measuring apparatus in a third embodiment of the present invention will be described. FIG. 6 is a configuration diagram of the optical interference measuring apparatus in the present embodiment. The optical interference measuring apparatus of the present embodiment uses a multiple-wavelength light source 300a including three diode lasers 30a, 30b, and 30c as a measurement light source. The diode lasers 30a, 30b, and 30c are stabilized by an etalon 31 as a single wavelength reference element.

The diode lasers 30a, 30b, and 30c are single frequency lasers having oscillation wavelengths different from one another. As such a diode laser, a DFB laser is used to be able to stably realize a single frequency oscillation at a comparatively low cost. However, the present embodiment is not limited to this and an external cavity diode laser (ECDL) or a vertical cavity surface emitting laser (VCSEL) may also be used. The laser does not have to be constituted by an independent laser element, and a laser constituted by integrating multiple wavelengths such as a DFB laser for optical communication may also be used.

Outputs from the diode lasers 30a, 30b, and 30c are emitted by a polarization-maintained fiber, and each output is divided into two after the multiplex by a polarization-maintained multiplexer. One of the divided light beams is converted into a parallel light beam by a collimator and then enters the etalon 31 as a wavelength reference element. The etalon 31 is a vacuum gap type etalon in order to prevent the influence of the medium dispersion, and its temperature is controlled by a temperature controller 32 with high accuracy. As a result, a vacuum wavelength of a transmission spectrum of the etalon 31 and a frequency interval is compensated with high accuracy.

In the present embodiment, the etalon 31 has a vacuum gap, but the etalon 31 having a solid gap can also be used. In this case, if a lithium niobate etalon is adopted, an optical path length modulation caused by an electro-optical effect can be performed. Therefore, a high-speed control of the etalon frequency interval can be performed as compared with the case of a temperature control, and it has an advantage in modulating the etalon frequency interval described below. As a compensating method of the frequency interval of the etalon 31, as described below, a beat signal between two lasers stabilized in adjacent transmission spectra of the etalon 31 may also be measured to control the frequency interval of the etalon 31 so that the beat frequency coincides with the reference oscillator. In this case, a highly accurate compensation of the frequency interval can be performed without depending on the long-term change of the etalon 31 caused by a stress open or the like.

The light beam transmitted through the etalon 31 enters a spectral optical element 33, and a transmission light intensity corresponding to each of the diode lasers 30a, 30b, and 30c is detected by a wavelength controller 34. The wavelength controller 34 controls injection currents of the diode lasers 30a, 30b, and 30c so that the transmittance of the light beam of each of the diode lasers 30a, 30b, and 30c with respect to the etalon 31 becomes constant. Such a control can stabilize the wavelengths of the diode lasers 30a, 30b, and 30c. In order to stabilize the wavelength with high accuracy, it is preferable that an incident light intensity as well as the transmission light intensity of the etalon 31 is measured. The laser wavelength may also be stabilized to a transmission spectrum peak of the etalon 31 as a reference by modulating the wavelength using a phase modulating element such as an EOM to synchronously detecting a reflection light intensity. In this case, because the transmission spectrum peak is a reference, a highly accurate stabilization can be performed without depending on the change of a transmission spectrum shape.

The etalon 31 stabilizes the frequencies of the diode lasers 30a and 30b in transmission spectra adjacent to each other, and also stabilizes the frequencies of the diode lasers 30a and 30c in transmission spectra at a remove of N spectra from each other. In other words, when an interval of the transmission spectra of the etalon 31 is defined as a first frequency interval $FSR_1$ and a frequency of the diode laser 30a is defined as $f_0$, frequencies of the diode lasers 30b and 30c are $f_0 + FSR_1$ and $f_0 + N \times FSR_1$, respectively. The multiple-wavelength light source obtained as above is used as a first multiple-wavelength light source 300a in the present embodiment.

The light beam emitted from the first multiple-wavelength light source 300a is divided into two light beams, and one of the light beams transmits through the frequency shifter 4 to shift the frequencies of the diode lasers 30a, 30b, and 30c by "df". The light beam emitted from the frequency shifter 4 is rotated to be a polarized light orthogonal to the incident light beam by a wavelength plate (not shown). The light beam transmitted through the frequency shifter 4 is used as a second multiple-wavelength light source 300b. The measurement of the interference phase between the test surface 8 and the reference surface 7 using the first multiple-wavelength light source 300a and the second multiple-wavelength light source 300b is the same as that of the first embodiment.

When differences (phase differences) of phases $\phi_{ref}$ and $\phi_{test}$ measured by the wavelengths of the diode lasers 30a, 30b, and 30c are defined as $\phi_{a1}$, $\phi_{b1}$, and $\phi_{c1}$, respectively, the optical path difference nD between the test surface 8 and the reference surface 7 is represented by the following three expressions 13.

$$\begin{cases} nD_1(N) = \dfrac{c}{f_0}(N + \varphi_{a1}) \\ nD_2(N_{13}) = \dfrac{c}{N \cdot FSR_1}(N_{13} + \varphi_{c1} - \varphi_{a1}) \\ nD_3(N_{12}) = \dfrac{c}{FSR_1}(N_{12} + \varphi_{b1} - \varphi_{a1}) \end{cases} \quad (13)$$

In the first to third formulas of expression 13, the wavelengths are represented as $c/f_0$, $c/(N \cdot FSR_1)$, and $c/FSR_1$, and the phases are represented as sums of the interference orders N, $N_{13}$, and $N_{12}$ and the fractional phases $\phi_{a1}$, $\phi_{c1} - \phi_{a1}$, and $\phi_{b1} - \phi_{a1}$, respectively. The second and third formulas can be derived by applying expression 6 to two wavelengths of the diode lasers 30a and 30c and two wavelengths of the diode lasers 30a and 30b, respectively.

On conditions that the measurement accuracies of the fractional phases $\phi_{a1}$, $\phi_{c1} - \phi_{a1}$, and $\phi_{b1} - \phi_{a1}$ are similar to one another, a shorter wavelength is preferably used in order to obtain a good measurement accuracy of the optical path. Therefore, in expression 13, the first formula has the highest accuracy and the third formula has the lowest accuracy. On the other hand, due to the ambiguity of the interference order, the third formula has the widest unambiguous measurement range and the first formula has the shortest unambiguous measurement range. However, there is a problem that the wavelength $c/FSR_1$ of the third formula is limited to equal to or less than around 100 mm when a few GHz is applied as a realistic first frequency interval $FSR_1$.

Figure 7:
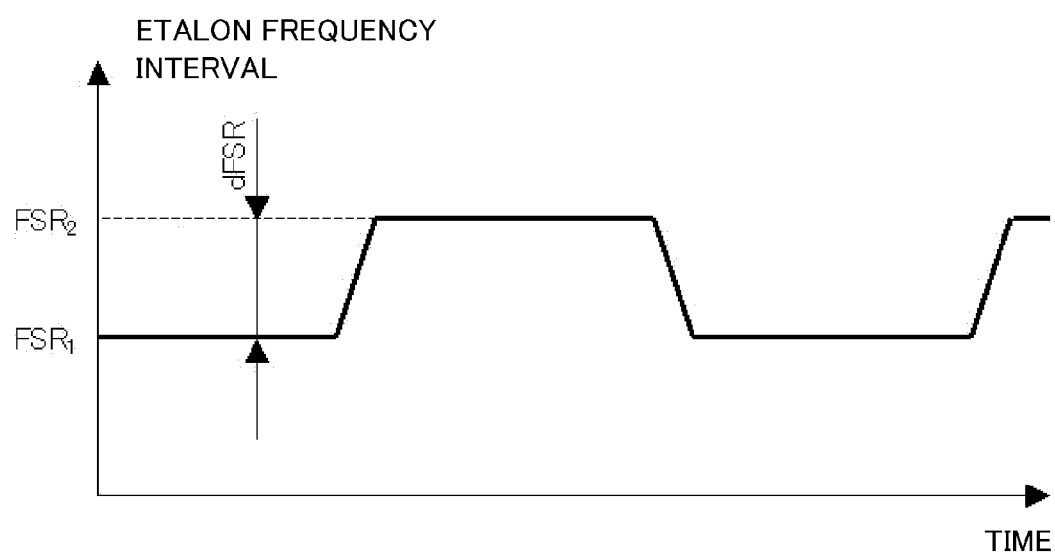
FIG. 7 is an illustration showing a change of an etalon frequency interval in the third embodiment.

Therefore in the present embodiment, as shown in FIG. 7, the analyzer 11 controls the temperature controller 32 to change the frequency interval of the etalon 31 by a minimal amount. In other words, the analyzer 11 and the temperature controller 32 (wavelength controller) periodically change the frequency interval of the etalon 31 between the first frequency interval $FSR_1$ and the second frequency interval $FSR_2$. The second frequency interval $FSR_2$ is represented as the following expression 14 using a minimal interval dFSR.

$$FSR_2 = FSR_1 + dFSR \quad (14)$$

For the second frequency interval $FSR_2$, when differences (phase differences) of the phases $\phi_{ref}$ and $\phi_{test}$ measured by the wavelengths of the diode lasers 30a, 30b, and 30c are defined as $\phi_{a2}$, $\phi_{b2}$, and $\phi_{c2}$, respectively, the optical path difference nD is represented by the following two expressions 15.

$$\begin{cases} nD_4(N'_{13}) = \dfrac{c}{N \cdot dFSR}(N'_{13} + \varphi_{c2} - \varphi_{a2} - (\varphi_{c1} - \varphi_{a1})) \\ nD_5 = \dfrac{c}{dFSR}(\varphi_{b2} - \varphi_{a2} - (\varphi_{b1} - \varphi_{a1})) \end{cases} \quad (15)$$

When the minimal interval dFSR is around 1 MHz, the longest wavelength c/dFSR reaches a few hundred meters and an unambiguous distance can cover all the measurement ranges in a common use. Therefore, in the second formula of expression 15, the interference order is omitted. This means that the absolute length measurement is realized, but as described above, longer the wavelength the lower the measurement accuracy. Therefore, in the present embodiment, five formulas of expressions 13 and 15 are combined to sequentially obtain the interference order N in the first formula. Therefore, the absolute length measurement while maintaining the accuracy can be realized. A specific calculation formula is represented by expression 16.

$$\begin{cases} nD_1 = \dfrac{c}{f_0}(N + \varphi_{a1}) \\ N = \mathrm{round}\left(\dfrac{f_0}{c}nD_2(N_{13}) - \varphi_{a1}\right) \\ N_{13} = \mathrm{round}\left(\dfrac{N \cdot FSR_1}{c}nD_3(N_{12}) - (\varphi_{c1} - \varphi_{a1})\right) \\ N_{12} = \mathrm{round}\left(\dfrac{FSR_1}{c}nD_4(N'_{13}) - (\varphi_{b1} - \varphi_{a1})\right) \\ N'_{13} = \mathrm{round}\left(\dfrac{N \cdot dFSR}{c}nD_5 - (\varphi_{c2} - \varphi_{a2} - (\varphi_{c1} - \varphi_{a1}))\right) \end{cases} \quad (16)$$

As shown in FIG. 7, the analyzer 11 changes the frequency interval FSR of the etalon 31 between the first frequency interval $FSR_1$ and the second frequency interval $FSR_2$. The analyzer 11 performs the absolute length measurement using expression 16 based on a phase measurement result in each frequency measurement result. In other words, the analyzer 11 calculates the optical path difference again based on the calculation results of the optical path differences in the first frequency interval $FSR_1$ and the second frequency interval $FSR_2$. When the modulation period of the frequency interval FSR is short, i.e. the frequency intervals are changed at high speed, the absolute length measurement can be always performed even if a test light beam is frequently shielded.

In the present embodiment, the frequency interval FSR of the etalon 31 is periodically changed to realize the constant absolute length measurement, but in the first and second embodiments, the same effect can be obtained by changing the frequencies of the oscillator.

Figure 8A:
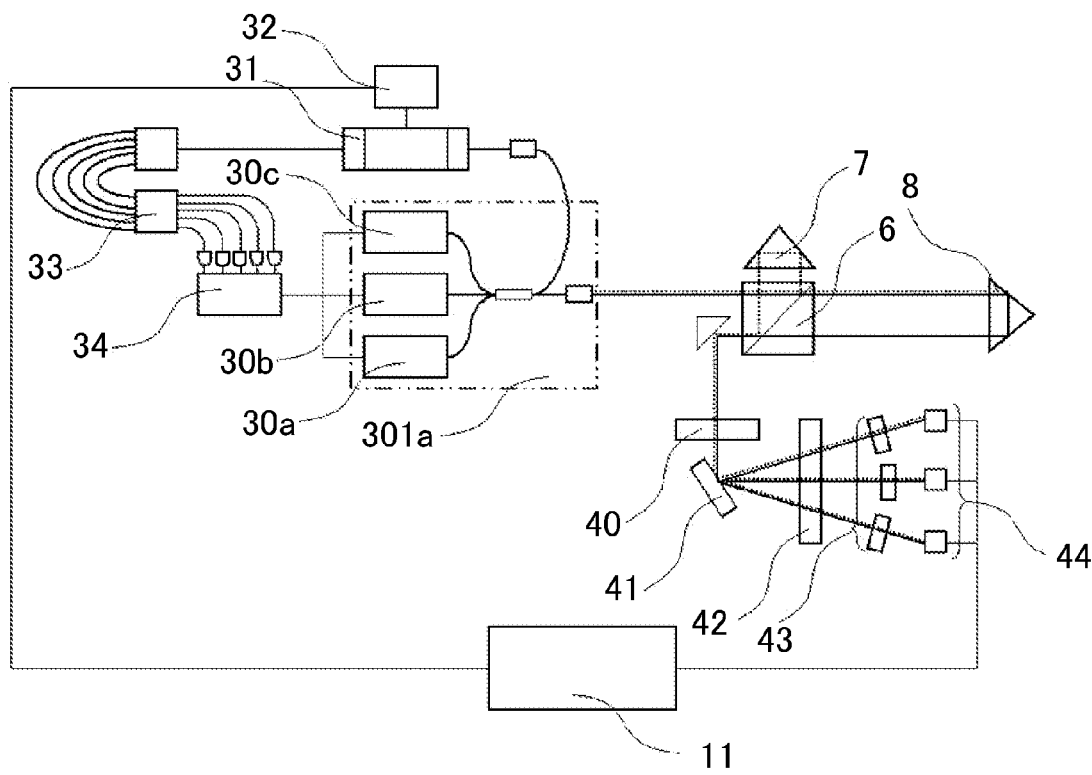
FIGS. 8A and 8B are configuration diagrams of an optical interference measuring apparatus which performs homodyne detection in the third embodiment.
Figure 8B:
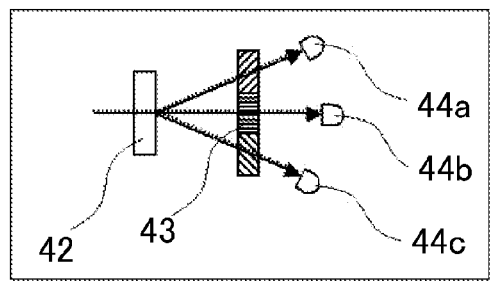

In the present embodiment, a heterodyne detection is performed using two multiple-wavelength light sources (the first multiple-wavelength light source 300a and the second multiple-wavelength light source 300b), but a homodyne detection can be performed using a single multiple-wavelength light source. FIGS. 8A and 8B are configuration diagrams of an optical interference measuring apparatus when performing the homodyne detection. The optical interference measuring apparatus shown in FIG. 8A is different from that shown in FIG. 6 in that the second multiple-wavelength light source 300b, the spectral optical element 9a for measuring the reference signal, and the detecting device 10a are excluded. The phase measurement section of the measurement signal is replaced with that used for homodyne detection.

As shown in FIG. 8A, a light beam emitted from a first multiple-wavelength light source 301a is separated into two light beams of a test light beam and a reference light beam by a polarizing beam splitter 6. The test light beam and the reference light beam transmit through a quarter wave plate 40 having a fast axis angle of 45 degrees with respect to each polarized light, and are changed to right-handed circular polarized light and left-handed circular polarized light, respectively. Then, the light beam enters a spectral optical element 41 and is divided for each wavelength of the diode lasers 30a, 30b, and 30c. The light beam is divided into three light beams in a direction vertical to a plane of paper by a grating beam splitter 42, and light intensities of the three light beams for respective wavelengths are independently detected by a detector array 44 after the light beam transmits through a polarizer array 43.

FIG. 8B is a detailed configuration diagram behind the grating beam splitter 42, which focuses on a wavelength of one diode laser. The polarizer array 43 is configured to include three polarizers whose transmission polarizing axes are rotated by 120 degrees one another with respect to the three light beams divided by the grating beam splitter 42. Three detectors 44a, 44b, and 44c of the detector array detect transmission light intensities of respective polarizers. When a phase of the measurement signal is defined as ϕ, light intensities $I_a$, $I_b$, and $I_c$ detected by the detectors 44a, 44b, and 44c are represented by expression 17.

$$I_a = I_0(1 + V\cos(\phi))$$
$$I_b = I_0(1 + V\cos(\phi + 2\pi/3)) \quad (17)$$
$$I_c = I_0(1 + V\cos(\phi + 4\pi/3))$$

In accordance with expression 17, the phase ϕ is calculated by expression 18.

$$\varphi = \tan^{-1}\left(\dfrac{-\sqrt{3}(I_b - I_c)}{2I_a - I_b - I_c}\right) \quad (18)$$

The analyzer 11 calculates the phase ϕ using expression 18 with respect to the diode lasers 30a, 30b, and 30c. The method of calculating the optical path based on the phase calculation result is the same as that of the heterodyne detection. As above, even if the homodyne detection is used, an absolute length measurement can be always realized by periodically changing frequency intervals of the etalon 31 to determine an interference order using expression 15 based on the phase measurement result in each frequency interval.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2009-048880, filed on Mar. 3, 2009, and Japanese Patent Application No. 2009-287779, filed on Dec. 18, 2009, which are hereby incorporated by reference herein in their entireties.

What is claimed is:

1. An optical interference measuring apparatus comprising:
   a first multiple-wavelength light source configured to emit a light beam having a plurality of spectra;
   a second multiple-wavelength light source configured to emit a light beam having a wavelength different from that of the light beam emitted from the first multiple-wavelength light source and having a polarization component orthogonal to that of the light beam emitted from the first multiple-wavelength light source;
a polarization optical element configured to separate the light beam emitted from the first multiple-wavelength light source and the light beam emitted from the second multiple-wavelength light source;
a reference surface provided at a reference position and configured to reflect the light beam emitted from the second multiple-wavelength light source;
a test surface provided at a test object and configured to reflect the light beam emitted from the first multiple-wavelength light source;
a spectral optical element configured to divide interference signals of the light beams of the first multiple-wavelength light source and the second multiple-wavelength light source;
a plurality of detectors configured to detect interference signals having single wavelengths of the light beams emitted from the first multiple-wavelength light source and the second multiple-wavelength light source with respect to a plurality of wavelengths based on the interference signals divided by the spectral optical element; and
an analyzer configured to process signals obtained from the detectors to calculate an optical path difference between the reference surface and the test surface.

2. An optical interference measuring apparatus according to claim 1, further comprising one reference oscillator configured to control both frequency intervals of the first and second multiple-wavelength light sources.

3. An optical interference measuring apparatus according to claim 1,
wherein the spectral optical element is an array waveguide grating which has a wavelength resolution of at least a wavelength interval of the first and second multiple-wavelength light sources.

4. An optical interference measuring apparatus according to claim 1,
wherein the analyzer is configured to calculate an interference phase between the test surface and the reference surface with respect to a plurality of frequencies based on the interference signals, and to calculate the optical path difference based on a change rate of the interference phase with respect to the plurality of frequencies.

5. An optical interference measuring apparatus according to claim 4,
wherein the analyzer is configured to calculate an interference order of the interference signal based on the calculated optical path difference, and to calculate the optical path difference again using the interference phase and the interference order with respect to the plurality of frequencies.

6. An optical interference measuring apparatus according to claim 5,
wherein the analyzer is configured to calculate a geometric distance by fitting a function with respect to the optical path difference calculated again,
the function is represented by a sum of the geometric distance and an amount of change of the optical path difference which changes in accordance with a refractive index of a medium between the reference surface and the test surface, and
the amount of change of the optical path difference is obtained by multiplying the refractive index of the medium having known dispersion characteristics between the reference surface and the test surface by the geometric distance.

7. An optical interference measuring apparatus according to claim 1,
wherein the first and second multiple-wavelength light sources are optical frequency comb sources which include a plurality of frequency components having frequency differences equivalent to each other.

8. An optical interference measuring apparatus according to claim 1,
wherein the first and second multiple-wavelength light sources generate a plurality of wavelengths by modulating a light beam emitted from a single narrowband wavelength light source by an optical modulator.

9. An optical interference measuring apparatus according to claim 1, further comprising a single wavelength reference element,
wherein each of the first and second multiple-wavelength light sources is stabilized by the single wavelength reference element.

10. An optical interference measuring apparatus according to claim 1,
wherein the analyzer is configured to periodically change a frequency interval of the first and second multiple-wavelength light sources between first and second frequency intervals, and to calculate the optical path difference again based on a calculation result of the optical path difference in the first frequency interval and a calculation result of the optical path difference in the second frequency interval.

11. An optical interference measuring apparatus comprising:
a first multiple-wavelength light source configured to emit a light beam having a plurality of spectra;
a wavelength controller configured to periodically control a frequency interval between a plurality of wavelengths of the first multiple-wavelength light source;
a polarization optical element configured to separate the light beam emitted from the first multiple-wavelength light source into two of a test light beam and a reference light beam;
a reference surface provided at a reference position and configured to reflect the reference light beam;
a test surface provided at a test object and configured to reflect the test light beam;
a spectral optical element configured to divide an interference signal of the reference light beam and the test light beam;
a plurality of detectors configured to detect interference signals having single wavelengths of the reference light beam and the test light beam with respect to a plurality of wavelengths based on the interference signals divided by the spectral optical element; and
an analyzer configured to process signals obtained from the detectors to calculate an optical path difference between the reference surface and the test surface.

* * * * *